United States Patent

Isomura

[11] Patent Number: 6,073,514
[45] Date of Patent: Jun. 13, 2000

[54] STEERING WHEEL

[75] Inventor: Motoi Isomura, Nagoya, Japan

[73] Assignee: Toyoda Gosei Co., Ltd., Aichi-ken, Japan

[21] Appl. No.: 09/138,603

[22] Filed: Aug. 24, 1998

[30] Foreign Application Priority Data

Aug. 25, 1997 [JP] Japan .................................. 9-228413

[51] Int. Cl.⁷ ..................................................... B62D 1/04
[52] U.S. Cl. ............................................. 74/552; 280/777
[58] Field of Search ................................ 74/552; 280/777

[56] References Cited

U.S. PATENT DOCUMENTS

| 5,090,731 | 2/1992  | Fujita et al. | 74/552 X |
| 5,267,486 | 12/1993 | Niwa et al.   | 74/552   |
| 5,356,178 | 10/1994 | Numata        | 74/552 X |
| 5,573,606 | 11/1996 | Evans et al.  | 74/552 X |

*Primary Examiner*—David A. Bucci
*Assistant Examiner*—Brandon C. Stallman
*Attorney, Agent, or Firm*—Pillsbury Madison & Sutro LLP

[57] ABSTRACT

A steering wheel is provided having a frame structure which is lightweight and excellent at absorbing shocks. The steering wheel comprises a boss mounted to a steering shaft, an annular-shaped grip frame which the driver gripped to steer the vehicle, and a base frame provided with the boss. A plurality of spoke frames extend from the grip frame toward the base frame. The plurality of spoke frames comprise first, second and third spoke frames. The first and second spoke frames are connected directly to the base frame. A connection member connects the third spoke frame and the base frame to each other. The connection member comprises a straight portion which extends to intersect the third spoke frame and is provided with first and second ends. Intermediate sections extend from the first and second ends of the straight portion, respectively, toward the base frame. Bent elbows connect the respective intermediate sections to the base frame.

22 Claims, 5 Drawing Sheets

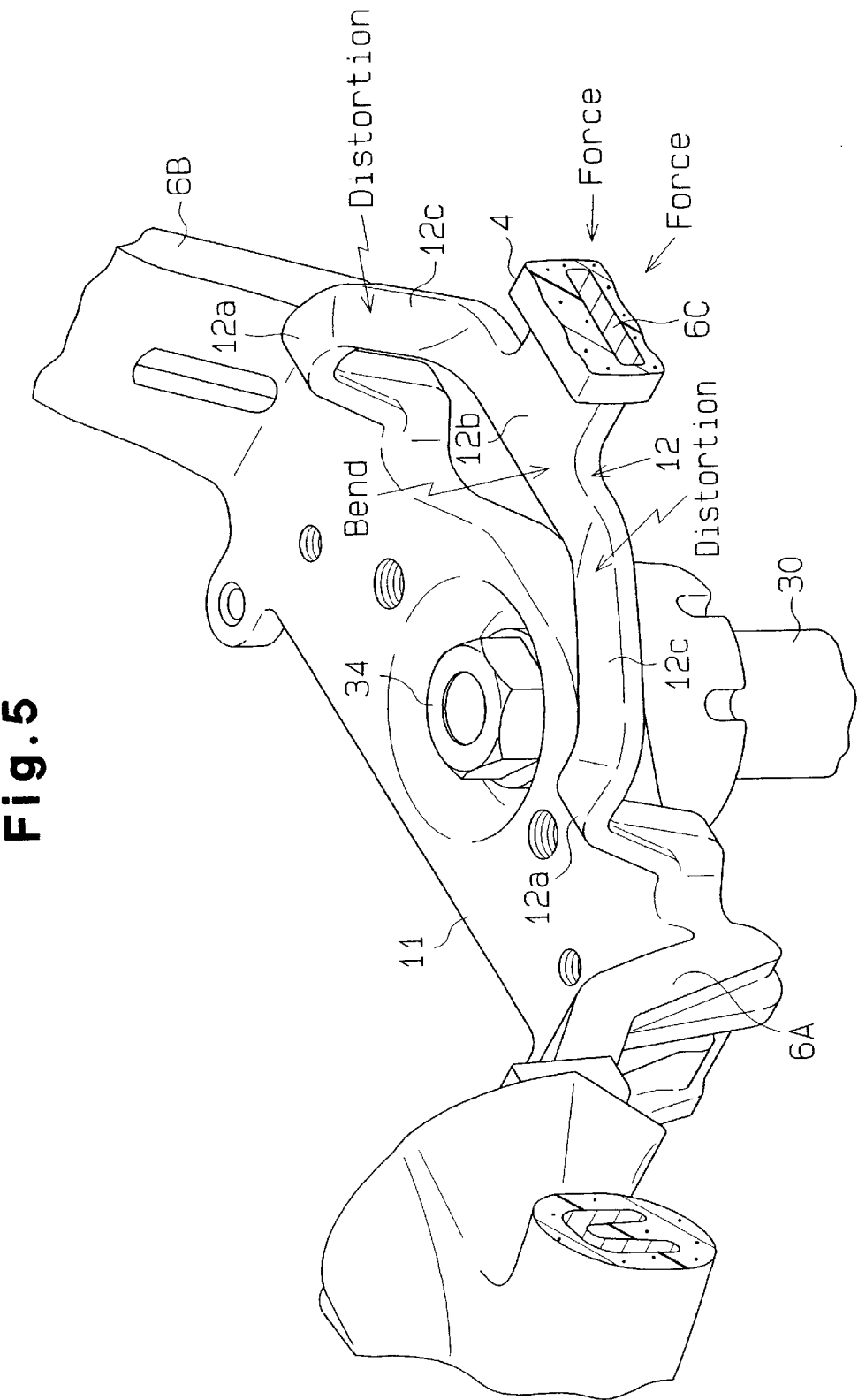

STEERING WHEEL

BACKGROUND OF THE INVENTION

1. Field of Invention

The present invention relates to a steering wheel and, more specifically, to a steering wheel frame structure suitable for using materials such as magnesium or magnesium alloys for a core metal of the steering wheel.

2. Description of the Related Art

Motor vehicles are yearly improving in terms of safety. In keeping with this trend, steering wheels are being refined to provide new safety features. Steering wheels are conventionally adapted only to be operated for maneuvering motor cars. In recent years, however, cars are commonly equipped with an air bag device to protect a driver at the time of collision. Furthermore, steering wheels themselves are designed to absorb shocks during a collision. To that end, steering wheels are provided with a frame having a predetermined rigidity and yet providing cushion at the time of collision.

Generally, a steering wheel frame comprises a boss mounted to a steering shaft, a base frame supporting the boss, an annular-shaped grip frame, and a plurality of spoke frames extending from the base frame and securing the grip frame to the base frame. The positional relationship between the grip frame and the base frame can be described with reference to a truncated cone. The grip frame corresponds to an outer periphery of a bottom surface of the cone, and the base frame corresponds to an outer periphery of a top surface of the cone. The top surface periphery being the one with a smaller diameter.

With a steering wheel having three spoke frames, the respective spoke frames are disposed upward and away from a boss plate. In a reference steering condition of the steering wheel, wherein the vehicle is traveling in a straight path rather than turning, the first and second spoke frames extend in a substantially horizontal manner from the grip frame toward a center thereof, and have their inner ends connected to each other by means of a connection bar. Also, the inner ends of the first and second spoke frames, respectively, are connected to the boss plate by means of two connection pieces which extend in a direction substantially parallel to an axis of the steering shaft.

The third spoke frame extends from the grip frame toward a center thereof between the first and second spoke frames, and an inner end of the third spoke frame is connected to the inner ends of the first and second spoke frames, respectively, by means of two straight connection bars.

When the steering wheel is forced in a forward or reverse direction with at least a force of a predetermined magnitude, the connection pieces deform in order to absorb shocks on a driver. The longer the connection pieces, the larger amounts of deformation can occur and more shock can be absorbed.

A steering wheel frame can be assembled by welding together a plurality of steel materials. In recent years, a well known technique is used which constructs the frame by die casting aluminum. The use of aluminum or aluminum alloys or materials having a relatively small specific gravity is useful in making steering wheels lightweight. Since lightweight steering wheels are in demand, magnesium has been proposed as a lighter material for steering wheel construction.

However, when a steering wheel frame is formed by die casting, bent portions are formed between respective spoke frames and connection pieces and between a base plate and the connection pieces. Magnesium has a small specific gravity and a low ductility. Accordingly, when connection pieces of a steering wheel, are die casted of magnesium during a collision when the steering wheel deforms, bent portions of the connection pieces may break and accordingly not adequately absorb shocks applied to the steering wheel.

SUMMARY OF THE INVENTION

It is an object of the invention to provide a frame structure of a steering wheel which enables the use of magnesium or magnesium alloys with small specific gravity, and which is lightweight and excellent in absorbing shocks.

In order to attain the above object, a steering wheel comprises a boss mounted to a steering shaft, an annular-shaped grip frame, which is gripped by a driver to accomplish steering and a base frame provided with the boss. A plurality of spoke frames extend from the grip frame toward the base frame. The plurality of spoke frames comprises first, second and third spoke frames. The first and second spoke frames are connected directly to the base frame. A connection member connects the third spoke frame to the base frame. The connection member comprises a straight portion which extends to intersect the third spoke frame and is provided with first and second ends. Intermediate sections extend from the first and second ends of the straight portion, respectively, toward the base frame. Bent elbows connect the respective intermediate sections to the base frame.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings.

FIG. 5 is a partially enlarged, perspective view showing a portion which deforms when a force is exerted on the steering wheel shown in FIG. 4.

DETAILED DESCRIPTION OF THE PREFERRED EMBODIMENTS

An embodiment of the invention is described with reference to the drawings.

Figure 1:
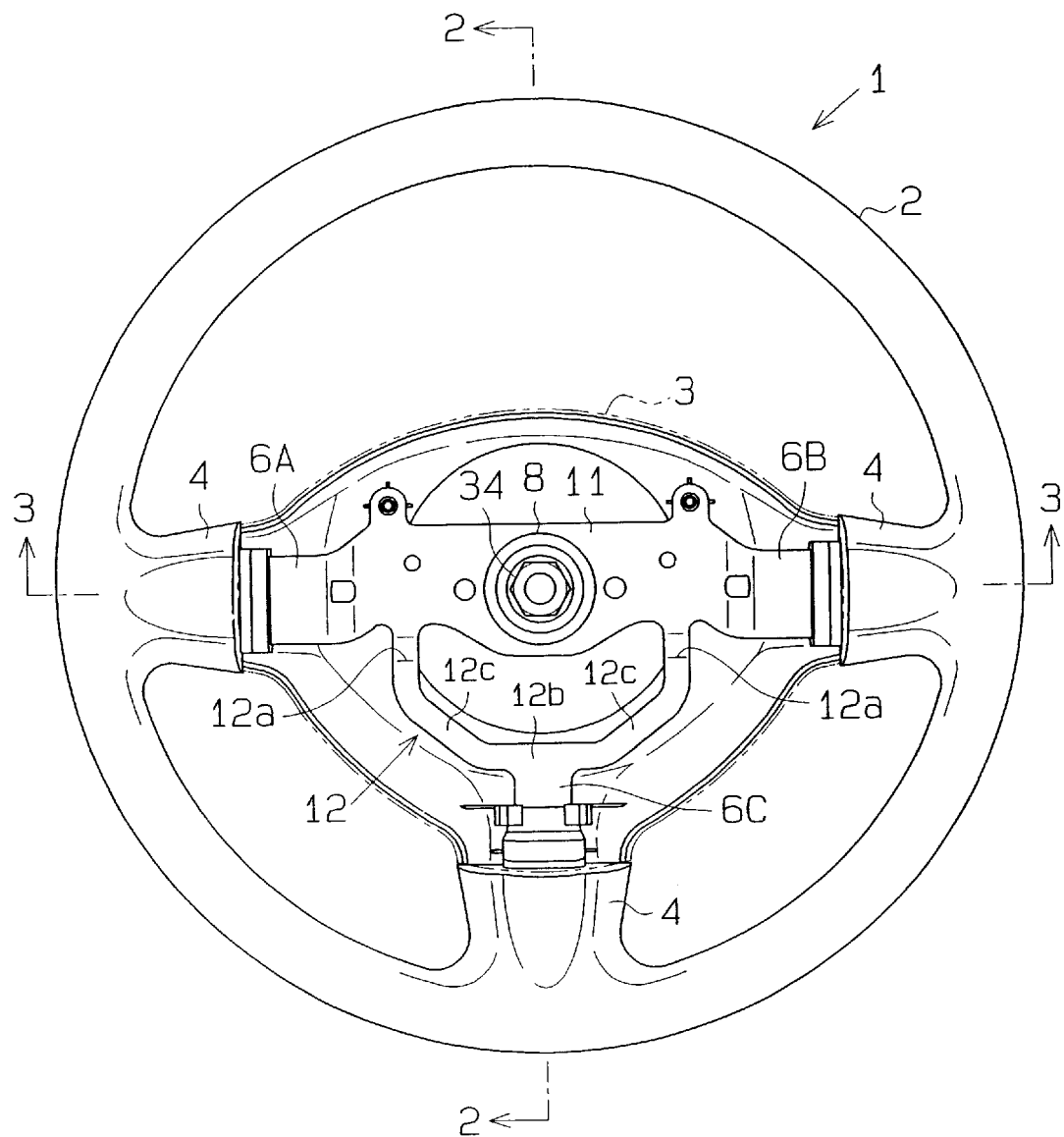
FIG. 1 is a plan view showing a frame structure of steering wheel according to an embodiment of the invention.
Figure 2:
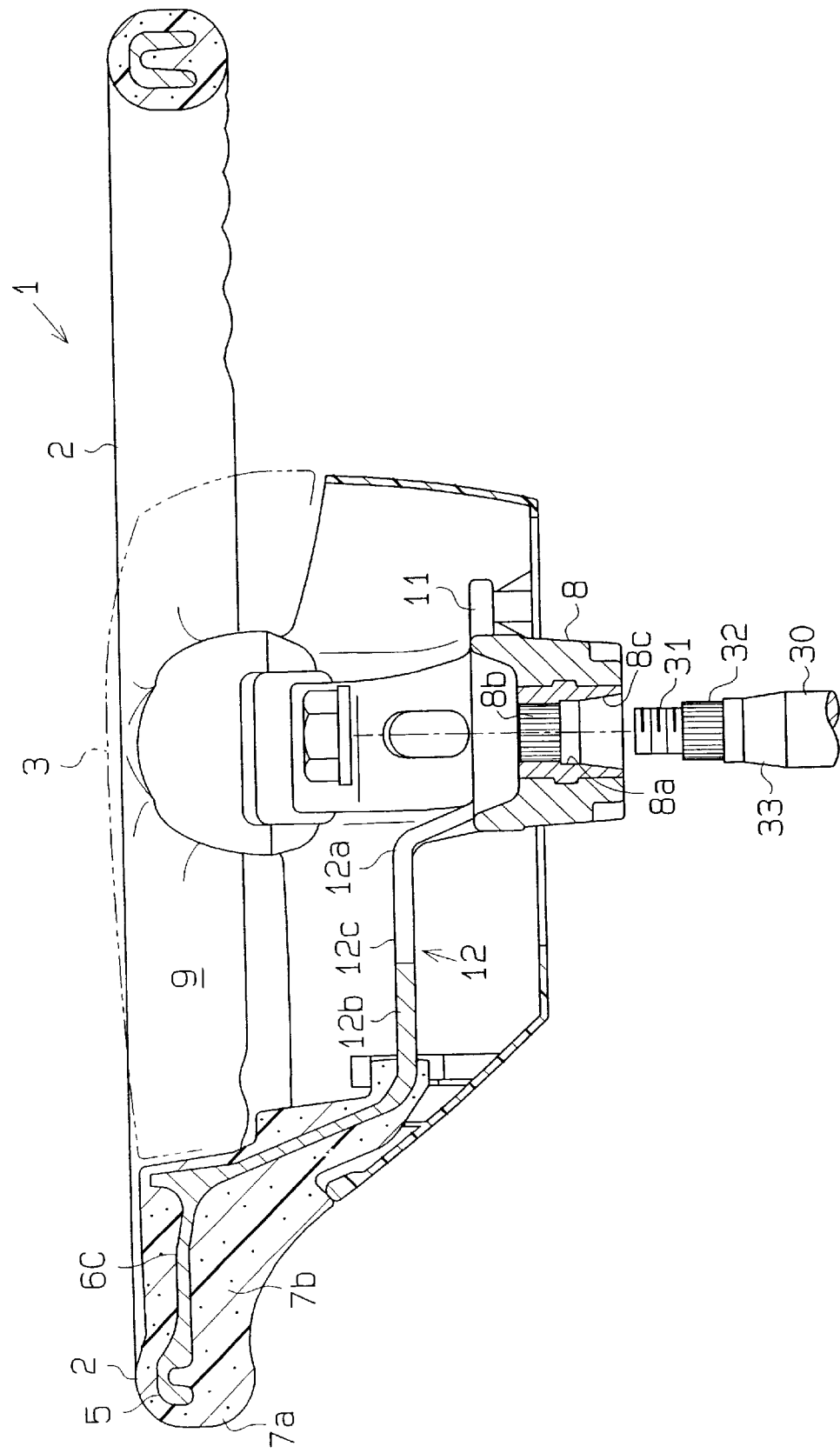
FIG. 2 is a cross-sectional view taken along the line 2—2 in FIG. 1.
Figure 3:
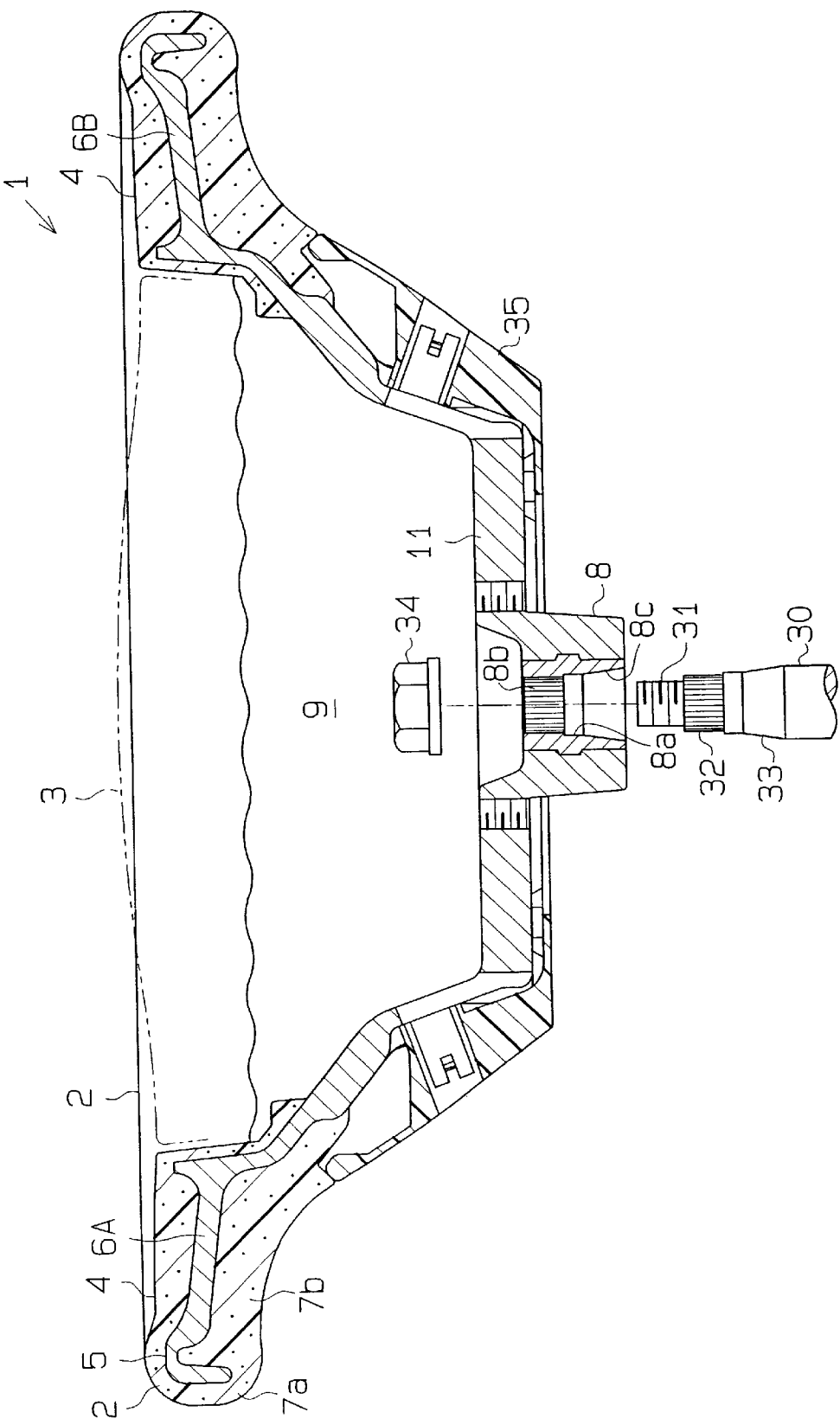
FIG. 3 is a cross-sectional view taken along the line 3—3 in FIG. 1.

As shown in FIG. 1, a steering wheel 1 comprises an annular-shaped grip portion 2 which defines a grip portion plane (not shown), a pad portion 3 disposed centrally of the steering wheel 1 and three spoke portions 4 which connect the grip portion 2 to the pad portion 3. As shown in FIGS. 2 and 3, the grip portion 2 comprises a grip frame 5, which is provided by die casting a light metal such as magnesium or magnesium alloys, and a cover 7a covering the grip frame 5. Further, the three spoke portions 4 comprises a first spoke frame 6A, second spoke frame 6B and a third spoke frame 6C, which are formed from the same material as that of the grip frame 5, and a cover 7b which covers connections between the respective spoke frames and the grip frame 5. The covers 7a, 7b and the pad portion 3 are formed from a soft synthetic resin material, such as, for example, urethane foam.

A recess 9 is defined between a back surface of the pad portion 3 and front surfaces of the first, second and third spoke frames 6A, 6B and 6C. Arranged in the recess 9 are other features (not shown) such as a switch plate and a membrane switch of a horn circuit, and an air bag device which protects a driver in the event of a collision. The membrane switch having two sheets is fixed to the switch plate to constitute a part of the horn circuit. When the pad portion 3 is pushed, the two sheets contact with each other, which sounds a horn. The air bag device comprises a bag-shaped air bag folded and received therein, an inflator for supplying a gas for expansion to the air bag, and a bag holder for holding and fixing of these elements.

Figure 4:
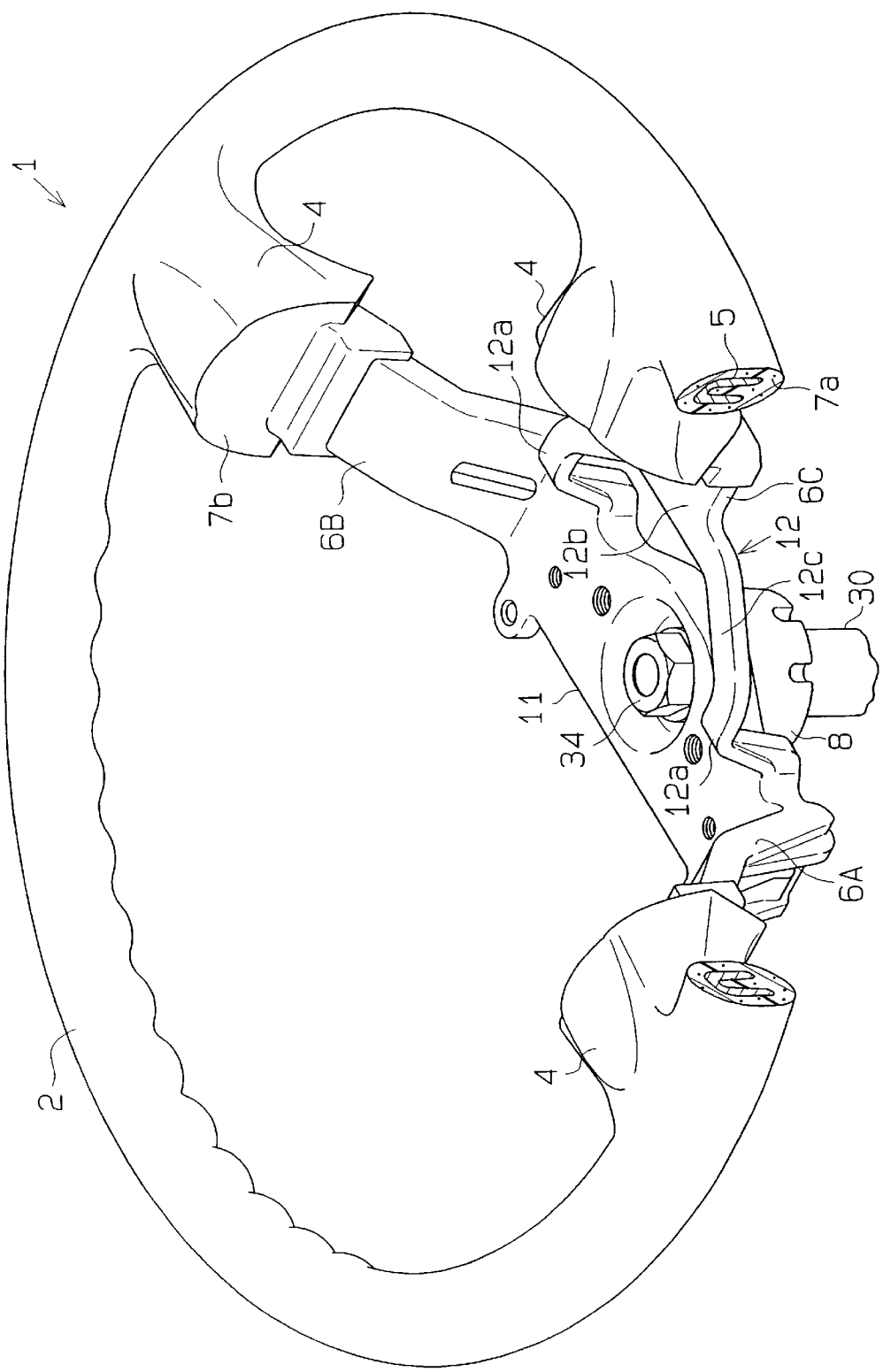
FIG. 4 is a perspective view showing a state, in which the frame structure shown in FIG. 1 is partially cut.

As shown in FIGS. 1, 4 and 5, the first spoke frame 6A and second spoke frame 6B, which extend substantially horizontally when the steering wheel is in its reference position, have bent portions which project from the grip portion 2 toward a back surface of the steering wheel 1. The first spoke frame 6A and second spoke frame 6B are connected to a base frame 11, which defines generally a base frame plane (not shown). Thus the grip portion 2 and the base frame 11 are not disposed in the same plane but in two different, substantially parallel planes. The base frame 11 extends radially from a boss 8 which serves to mount the steering wheel 1 to a steering shaft 30.

An assembly construction of the boss 8 and the steering shaft 30 is described hereinbelow with reference to FIGS. 2 and 3. A male threaded portion 31 is provided on a tip end of the steering shaft 30. A slip preventive surface 32 and a tapered surface 33 are provided on the steering shaft 30 toward a base end thereof. The slip preventive surface 32 is provided with a predetermined number of teeth (generally, about 30) which are formed on and along the steering shaft 30. An outer diameter of the slip preventive surface 32 is larger than that of the male thread portion 31 but smaller than that of the steering shaft 30. The boss 8 is formed centrally thereof with an inner peripheral surface 8a defining a through hole which serves to securely connect the boss 8 and the steering shaft 30 to each other. A slip preventive surface 8b and a tapered surface 8c are provided adjacent to the inner peripheral surface defining the through hole 8a to correspond to the slip preventive surface 32 and tapered surface 33 of the steering shaft 30.

In an assembling operation of the steering wheel 1, the tip end of the steering shaft 30 is inserted through the boss 8. A nut 34 is screwed onto the male thread portion 31 of the steering shaft 30 which projects from the boss 8. In this manner, the boss 8 is secured to the steering shaft 30. Incidentally, peripheries of the boss 8 and of the spoke portions 4 are covered with a back cover 35 of a synthetic resin. The back cover 35 is fixed to the first spoke frame 6A and second spoke frame 6B by means of screws and latch pawls (not shown).

As shown in FIGS. 1 and 4, the third spoke frame 6C extends in an inclined manner from the grip portion 2 toward the base frame 11 between the first spoke frame 6A and second spoke frame 6B. A bridge 12 connects the third spoke frame 6C and base frame 11 to each other. The bridge 12 comprises a straight portion 12b substantially perpendicular to the third spoke frame 6C, two bent elbows 12a, and an inclining portion 12c connecting both ends of the straight portion 12b to the respective elbows 12a. The bridge 12 is connected to the base frame 11 by means of the respective elbows 12a. Each element 12a, 12b and 12c, comprising the bridge 12 is formed to be smaller in width than the respective spoke frames 6A, 6B and 6C and the base frame 11.

The embodiment of the invention constructed in the above-mentioned manner achieves the following effects.

In the embodiment, the bridge 12 has the straight portion 12b extending substantially perpendicular to the third spoke frame 6C. When a force is exerted in the forward and reverse direction of the steering wheel 1 as shown in FIG. 5, the main deformation occurs in the bent portions or the elbows 12a and the straight portion 12b of the bridge 12. The force is dispersedly absorbed by the straight portion 12b. Accordingly, the force is not overly concentrated in the elbows 12a, which would cause them to break, but the elbows 2a deform as designed. As a result, the steering wheel 1 can effectively absorb the force. The various structures of the invention may be varied and modified to deform at a desired predetermined amount of force on the steering wheel.

The bridge 12 has the inclining portion 12c connecting both ends of the straight portion 12b. Accordingly, when the straight portion 12b becomes curved backward, the bridge 12 is distorted at the inclining portion 12c to deform.

The force is further dispersed by synergism of bending the straight portion 12b and distorting the inclining portion 12c. As a result, the steering wheel 1 can more effectively absorb the applied force.

In this embodiment, the grip frame 5, first, second and third spoke frames 6A, 6B and 6C, a major part of the boss 8, base frame 11 and the bridge 12 are provided by die casting of a light material such as magnesium or magnesium alloys. Accordingly, the entire frame of the steering wheel has a lightweight, and consequently the steering wheel 1 has a lightweight.

The present invention is not limited to the above preferred embodiment but can be suitably modified in various parts without deviating from the spirit of the invention. For example:

(1) In the preferred embodiment, the invention is embodied in the steering wheel 1 having the three spoke portions 4. Another embodiment includes a steering wheel having four or more spoke portions. By way of example, where the invention is embodied in a steering wheel having four spoke portions, first and second spoke frames extend substantially horizontally from a center of the steering wheel in a steering reference position, and third and fourth spoke frames extend substantially perpendicular to the first and second spoke frames.

(2) In another embodiment, the inclining portion 12c of the preferred embodiment is omitted, and the elbows 12a are connected directly to the straight portion 12b.

(3) In another embodiment, in place of the membrane switch, switches in the other forms, for example, a leaf spring type horn switch mechanism may be provided. Also, the invention may be embodied in a steering wheel provided with no air bag device.

(4) A materials such as steel, other than magnesium or magnesium alloys may be used for the frame of the steering wheel in another embodiment.

(5) In yet another embodiment, the covers 7a, 7b and pad portion 3 in the embodiment may be formed integrally.

Therefore, the present examples and embodiments are to be considered as illustrative and not restrictive and the invention is not to be limited to the details given herein, but should be determined by the appended claims and the legal equivalents thereof.

What is claimed is:

1. A steering wheel comprising:
   a boss adapted to be mounted to a steering shaft;
   a grip frame;
   a base frame provided with the boss;
   first, second and third spoke frames, each extending from the grip frame toward the base frame; and
   a connection member for connecting the third spoke frame to the base frame, the connection member comprising:
      a straight portion extending substantially parallel to the base frame, the straight portion having first and second ends;
      first and second intermediate sections extending in an inclined manner from the first and second ends of the straight portion, respectively, towards the base frame; and
      first and second bent elbows connecting the respective intermediate sections to the base frame at first and second connecting points, the first and second bent elbows positioned in a plane intermediate between a plane of the grip frame and a plane of the base plate.

2. The steering wheel according to claim 1, wherein the connection member has a cross sectional area equal to or less than that of the third spoke frame.

3. The steering wheel according to claim 1, wherein the straight portion extends substantially perpendicular to the third spoke frame.

4. The steering wheel according to claim 1, wherein the straight portion bends when a force of a predetermined amount is exerted upon the steering wheel from at least either a front or a backside of the steering wheel.

5. The steering wheel according to claim 1, wherein the intermediate sections are distorted when a force of a predetermined amount is exerted upon the steering wheel from at least either a front or a backside of the steering wheel.

6. The steering wheel according to claim 1, wherein the elbows extend in a substantially vertical direction from the base frame, the elbows being bent toward the base frame when a force of a predetermined amount is exerted upon the steering wheel from a front or a backside of the steering wheel.

7. The steering wheel according to claim 1, wherein the grip frame, the base frame, the first, second and third spoke frames and the connection member are integrally formed.

8. The steering wheel according to claim 1, wherein the grip frame, the base frame, the first, second and third spoke frames and the connection member are made by die casting one of a magnesium and a magnesium alloy.

9. The steering wheel of claim 1, wherein said straight portion is deformable.

10. The steering wheel according to claim 1, wherein the straight portion and the first and the second intermediate portions are substantially arranged in a plane.

11. The steering wheel according to claim 1, wherein the straight portion is substantially arranged in a plane, and the first and second intermediate sections are also substantially arranged in the plane.

12. The steering wheel according to claim 1, wherein a polygon is defined by the straight portion, the first intermediate section, the second intermediate section, the first bent elbow, the second bent elbow and a part of the base frame that lies between the first and the second connection points, wherein the polygon deforms when a force of a predetermined amount is exerted upon the steering wheel from at least either a front or a backside of the steering wheel.

13. A steering wheel comprising:
    a boss adapted to be mounted to a steering shaft;
    an annular-shaped grip frame;
    a base frame provided with the boss;
    first, second and third spoke frames extending from the grip frame toward the base frame, the first and second spoke frames being connected to the base frame; and
    a connection member for connecting the third spoke frame to the base frame, the connection member comprising;
       a straight portion having first and second ends, wherein the straight portion extends substantially perpendicularly to the third spoke frame and is substantially parallel to the base frame;
       first and second intermediate sections extending in an inclined manner from the first and second ends of the straight portion, respectively, toward the base frame; and
       first and second bend elbows connecting the respective intermediate sections to the base frame at two connection points, the first and second bent elbows positioned in a plane intermediate between a plane of the grip frame and a plane of the base plate.

14. The steering wheel according to claim 13, wherein the connection member has a cross sectional area equal to or less than that of the third spoke frame.

15. The steering wheel according to claim 13, wherein the straight portion is bent when a force of a predetermined amount is exerted upon the steering wheel from at least either a front or a backside of the steering wheel.

16. The steering wheel according to claim 13, wherein the intermediate sections are distorted when a force of a predetermined amount is exerted on the steering wheel from at least either a front or a backside of the steering wheel.

17. The steering wheel according to claim 13, wherein elbows extend substantially in a vertical direction from the base frame, the elbows being bent toward the base frame when a force of a predetermined amount is exerted upon the steering wheel from a front or a backside of the steering wheel.

18. The steering wheel according to claim 13, where in the grip frame the base frame, the first, second and third spoke frames and the connection member are integrally formed.

19. The steering wheel according to claim 18, wherein the grip frame, the base frame, the first, second and third spoke frames and the connection member are made by die casting one of a magnesium and a magnesium alloy.

20. The steering wheel of claim 13, wherein the first and second intermediate sections extend substantially parallel to the plane defined by the grip frame.

21. The steering wheel according to claim 13, wherein the plane is parallel to and different from a plane defined by the base frame.

22. The steering wheel according to claim 13, wherein a polygon is defined by the straight portion, the first intermediate section, the second intermediate section, the first bent elbow, the second bent elbow and a part of the base frame that lies between the first and the second connection points, wherein the polygon deforms when a force of a predetermined amount is exerted upon the steering wheel from at least either a front or a backside of the steering wheel.

* * * * *